Patented Jan. 12, 1926.

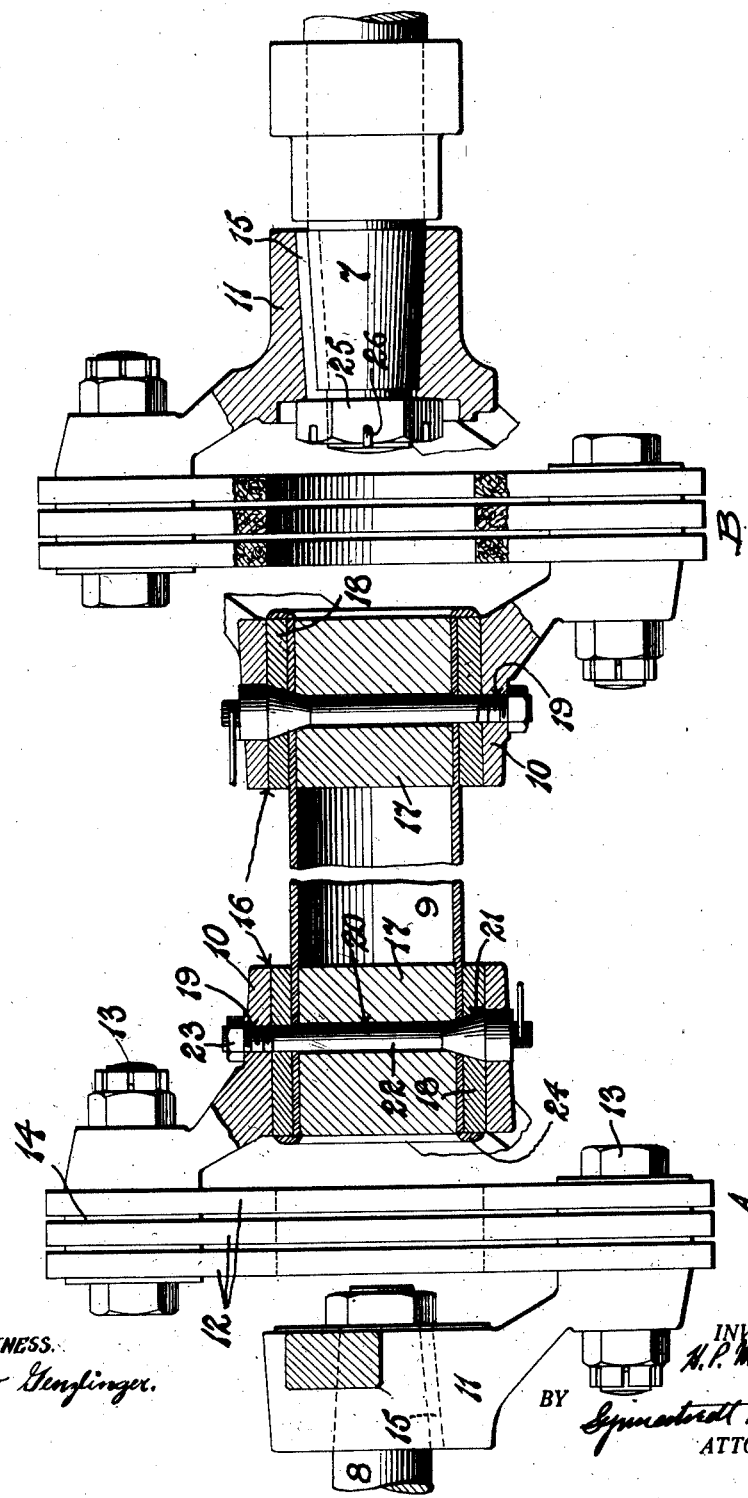

1,569,838

UNITED STATES PATENT OFFICE.

HARRY P. MACDONALD, OF MONTCLAIR, NEW JERSEY, ASSIGNOR, BY MESNE ASSIGNMENTS, TO SPICER MANUFACTURING CORPORATION, OF SOUTH PLAINFIELD, NEW JERSEY, A CORPORATION OF VIRGINIA.

PROPELLER-SHAFT ASSEMBLY.

Application filed June 19, 1920. Serial No. 390,100.

*To all whom it may concern:*

Be it known that I, HARRY P. MACDONALD, a citizen of the United States, residing at Montclair, in the county of Essex and State of New Jersey, have invented certain new and useful Improvements in Propeller-Shaft Assemblies, of which the following is a specification.

This invention relates to propeller shaft assemblies and is particularly useful in connection with drives for automobiles, and other torque transmission devices.

Such drive assemblies usually consist of the transmission shaft leading out from the gear box, the rear axle shaft and an intermediate or floating shaft, the floating member being connected to the shafts by universal joints. In constructions of this character, particularly where the universal joints are of the flexible disc type, there is considerable difficulty in assembling the parts on the vehicle owing to the fact that there is no slip joint connection and to the variations in the overall length of the shaft corresponding with the different positions the rear springs may take, which variations must be taken up by the flexure of the discs. When the shaft is first put into a car and the discs are new and stiff there is some difficulty experienced and considerable time and labor involved in getting the floating member in place and putting the bolts through the discs of the joints. Furthermore, because of the difficulty in access, the workmen are at a disadvantage in pulling up the nuts on the joint bolts and there is a possibility of improper bolt tension, either too little or too great. For either of these reasons it is desirable to have an assembly in which all of the joint bolts are in place and in which the floating member may be easily and quickly inserted, and it is the primary object of my present invention to provide a construction of this general character in which the foregoing difficulties are obviated and the advantages herein noted obtained.

I accomplish the foregoing, together with such other objects as may hereinafter appear, by means of a construction, the preferred embodiment of which I have illustrated in the accompanying drawing, wherein:

The figure is a side elevation and partial section of an automotive drive assembly embodying my improvements.

Referring now to the drawing, the shaft 7 may be considered as the transmission shaft; the shaft 8 as the rear axle shaft; the tubular shaft 9, as the intermediate or floating shaft; and the universal joints A and B, as the joints serving to connect the intermediate shaft or floating member to the respective shaft sections. The universal joints A and B, which are usually counterparts, are preferably composed of a pair of offset spiders 10 and 11, each having a plurality of arms, ordinarily three in number, and a plurality of flexible discs 12, composed of rubberized fabric or the like, the discs being connected to the feet of the respective spiders by means of the bolts 13, suitable washers 14 being inserted where needed. The aperture in the hub of the spiders 11 is shaped so as to receive and fit the ends of the respective shafts 7 and 8, each hub and shaft being keyed together or splined as at 15. The arrangement thus far described is old.

In carrying out my improvement I construct at least one of the spiders 10, and preferably both, with a cylindrical bore 16 in the hub, which is accurately machined. Where the floating member 9 is a tube, as shown, I force or press a plug 17 into each end, the plug being cylindrical and of a diameter slightly in excess of the inside diameter of the tube, so that the end of the tube is expanded. I then press over the ends of the tube, a collar 18, the diameter of the bore of which is slightly less than the outside diameter of the already expanded end of the tube. By this arrangement the tube, plugs and collars are securely and rigidly joined together in the manner set forth in my copending application, filed April 17, 1920, Serial No. 374,574, in which I have broadly claimed this particular character of joint. The outside surfaces of the collars 18 are machined so as to have a push fit in the spiders 10. A hole is drilled through the spider, collar, tube and plug, such hole having a tapped portion 19 on one side of the spider, being enlarged as indicated at 20 and counterbored at 21 to a cone-shape to receive a correspondingly shaped locking pin 22, the shank of which is threaded for the reception of the nut 23. If desired, the plug, tube and collar may be welded together as indicated at 24.

The method of assembly is as follows: The parts constituting the joints are properly bolted together and then the joints are slipped over the ends of their respective shafts 7 and 8 and are held in place by means of the castellated nuts 25, such nuts being tightened up by the introduction of a wrench through the central openings in the discs of the joints. Cotter pins 26 are used to lock the nuts 25. The floating member is now placed in position by slipping an end through one of the spiders and pushing or telescoping it back beyond its normal position relatively to such spider so as to allow the other end to be inserted or slipped into its spider, after which the pins 22 are inserted, turned up tightly and locked by the nuts 23. A tight driving joint free from lost motion and which will not rattle in service is thus secured. Should there be any wear on the pins 22 or should the hole become enlarged, this can be compensated for by drawing up the pins more tightly, the cone-shaped portion thus serving to always secure a tight joint.

The tube will not wear at the hole because the plugs, tube and collars are as though solid. Another advantage of the arrangement is that commercial variations in the size of the tube are readily compensated for, it being necessary only to be accurate in machining the collar to the proper outside diameter and the hubs to the proper inside diameter. The arrangement of locking pin is also such as to take care of any irregularities and discrepancies of miner character, so that the whole construction lends itself to interchangeability of parts and to production on a large scale. To prevent the locking pins from unscrewing, a wire is passed through the eye in the squared end of the pin and fastened as by wrapping it around the hub.

It will be understood that my invention is not limited to the precise embodiment shown in the drawing and that variations may be made therefrom without departing from the spirit of the invention as defined herein and set forth in the appended claims. It will also be understood that the invention is applicable to assemblies in which there are more than two joints. The term telescopic is used herein in a broad sense.

I claim:

1. In torque transmission assemblies, the combination of two spaced shafts, an intermediate or floating shaft therebetween, means forming a driving connection between the ends of the floating member and the respective shafts, said floating member being capable of sliding movement past one of said means substantially beyond its normal position relatively thereto.

2. In torque transmission assemblies, the combination of a pair of shafts, a universal joint for each shaft, and a floating member intermediate said shafts and adapted to be connected to said joints, said intermediate shaft being telescopable in one of said joints substantially beyond its normal position relatively thereto, together with means for fixing the position of said shaft with respect to said joint.

3. In torque transmission assemblies, the combination of a pair of shafts, a flexible joint for each shaft, an intermediate floating shaft member between said shafts and adapted to be connected to said joints, one of said joints having a hub portion adapted to telescopically receive an end of said floating member, for assembly purposes, beyond its normal position relatively thereto, together with means adapted to fix the position of the floating member in said hub.

4. In torque transmission assemblies, the combination of a pair of shafts, a flexible joint for each shaft, an intermediate floating member between said shafts adapted to be connected with said joints, one of said joints having a hub portion adapted to telescopically receive an end of said intermediate shaft member substantially beyond its normal position relatively thereto, and a bolt-like pin adapted to be passed through said end and said hub portion.

5. In automotive drive assemblies, the combination of a pair of shafts, an intermediate or floating shaft member, a pair of flexible joints between adjacent ends of the shafting, said joints consisting of a pair of spiders, a flexible element therebetween, and means for securing the flexible element to the respective spiders, one of said spiders having a hub adapted to telescopically receive an end of the floating shaft member beyond its normal position relatively thereto, so as to permit insertion of the other end of said floating shaft member in the other spider, and means for preventing relative rotation between said spider and said floating member.

6. In torque transmission assemblies, the combination of a pair of shafts, an intermediate floating shaft member, and a universal joint for connecting said floating member to each shaft, said floating member being telescopable with both joints, for assembly purposes, beyond its normal position relatively thereto.

7. In torque transmission assemblies, the combination of a pair of shafts, an intermediate floating shaft member, and a universal joint for connecting said floating member to each shaft, said floating member being telescopable with both joints substantially beyond its normal position relatively thereto, together with means for locking the floating member to each joint.

8. In an assembly for transmitting power between a driving and a driven shaft, the combination of a supported driving shaft, a flexible joint therefor, a supported driven shaft, a flexible joint therefor, and a connecting member connecting said joints, said member being telescopable with one of the joints beyond its normal position relatively thereto, so that it can be put in place after the flexible joints are connected with their respective supported shafts.

9. In an assembly for transmitting power between a driving and a driven shaft, the combination of a supported driving shaft, a flexible joint therefor, a supported driven shaft, a flexible joint therefor, each of said joints including a spider having a hub with a cylindrical bore, and a floating shaft forming a connection between said joints, said shaft being cylindrical and telescopable in the bores of said spiders substantially beyond its normal position relatively thereto, together with means passing through said hubs and the floating shaft for securing said shaft to the spider.

In testimony whereof, I have hereunto signed my name.

HARRY P. MACDONALD.